United States Patent [19]

Hoffman

[11] Patent Number: 4,974,682
[45] Date of Patent: * Dec. 4, 1990

[54] HAMMER DRIVEN SOIL CORING DEVICE

[76] Inventor: Michael R. Hoffman, 339 Bayview Dr. NE, St. Petersburg, Fla. 33704

[*] Notice: The portion of the term of this patent subsequent to Dec. 5, 2006 has been disclaimed.

[21] Appl. No.: 461,081

[22] Filed: Jan. 4, 1990

[51] Int. Cl.$^5$ .......................... A01B 1/24; E21B 25/00
[52] U.S. Cl. ..................................... 172/22; 172/430; 175/313; 294/50.7
[58] Field of Search .................... 172/19, 20, 22, 25, 172/371; 175/313; 294/50.7, 57; 30/280, 301, 316, DIG. 7; D8/1, 7

[56] References Cited

U.S. PATENT DOCUMENTS

| | | | |
|---|---|---|---|
| 127,150 | 5/1872 | Cook | 294/50.7 X |
| 588,833 | 8/1897 | Overbey | 294/50.7 X |
| 785,742 | 3/1905 | Lipps | 294/50.7 X |
| 1,866,073 | 7/1932 | Aberle | 172/22 X |
| 2,708,593 | 5/1955 | Benoist | 294/50.7 |
| 3,149,873 | 9/1964 | Mockabee | 294/50.7 X |
| 3,444,938 | 5/1969 | Ballmann | 294/50.7 X |
| 3,534,994 | 10/1970 | Sterk | 294/50.7 X |
| 4,715,634 | 12/1987 | Mueller et al. | 294/50.7 X |
| 4,884,638 | 12/1989 | Hoffman | 172/22 |

Primary Examiner—Randolph A. Reese
Assistant Examiner—Jeffrey L. Thompson

[57] ABSTRACT

A hammer driven soil coring device for use on golf course greens having a cylindrical cutting tube that has a lower cutting edge and longitudinally extending guide slots which serve as a guide for an ejector plate. Affixed to the cylindrical cutting tube is a cutter cap to which is affixed a support tube. The support tube has one vertically oriented slot. The slot serves as a guide for a stop which serves as a device to control the depth that a tamping plate achieves when the cylindrical cutting tube is driven into the surface of the green. A hand knob extends through the slot into a cylindrical rod for extending the tamping plate beyond the cylindrical cutting tube and to lock the tamping plate into a fixed position. A bubble level is located within the support tube. An impact head is located at the end of the tube with an aperture that allows the operator to view a bubble level. A handle extends perpendicularly through the impact head as well as the support tube and is affixed to each by means of a spring lock pin.

6 Claims, 1 Drawing Sheet

U.S. Patent      Dec. 4, 1990      4,974,682
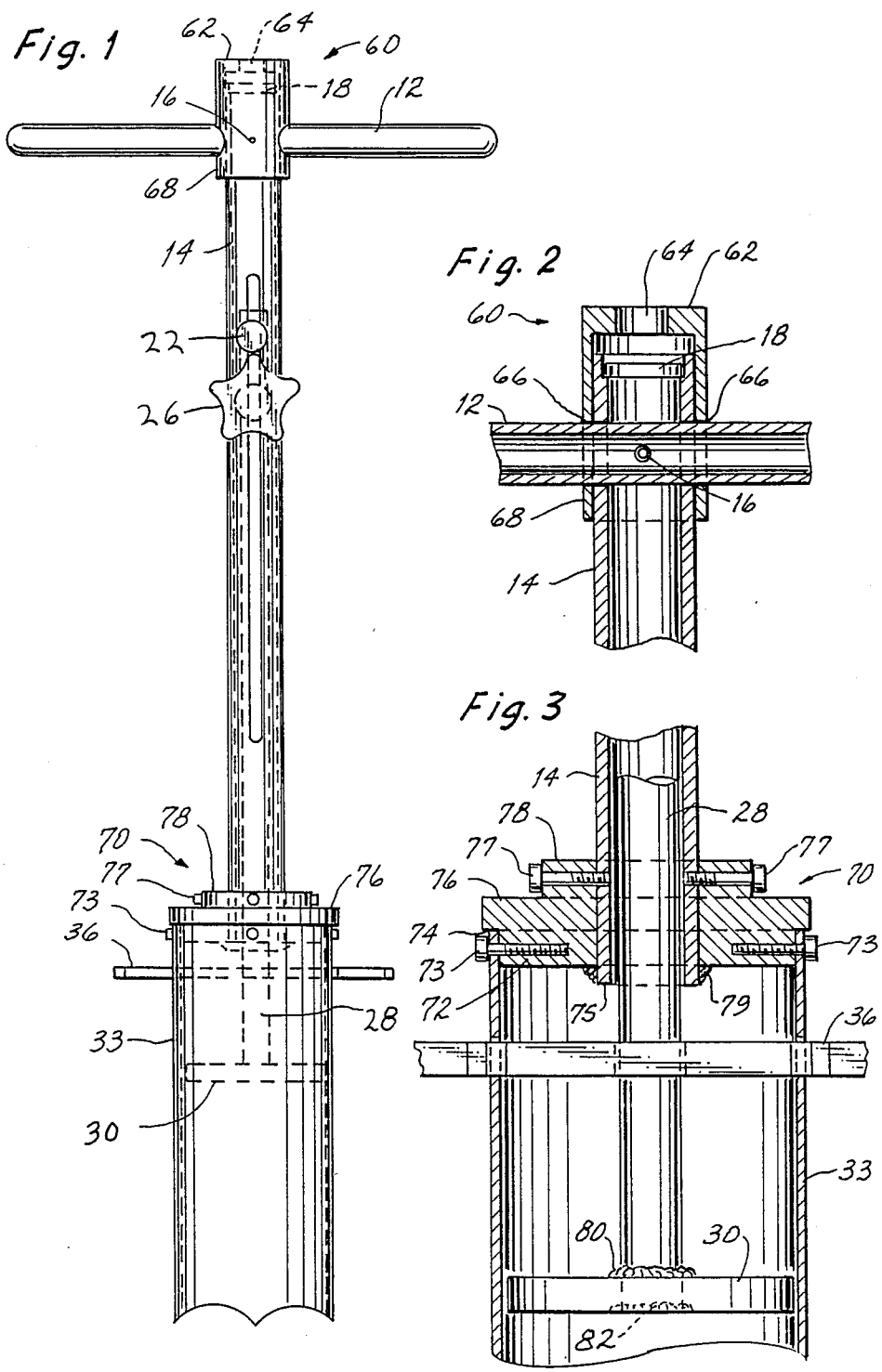

HAMMER DRIVEN SOIL CORING DEVICE

BACKGROUND OF THE INVENTION

1. Field of the Invention

The present invention relates to a hammer driven soil coring device for use on golf course greens.

2. Description of Prior Art

Generally devices used to extract a soil plug from golf course greens are adequate in their operation, however, they lack versatility, accuracy and consistency that is necessary to achieve the best result. Several devices used to extract a soil plug from golf course greens exist, generally exhibiting the same inconsistencies. For example, when a soil plug is extracted with a hole cutter that utilizes a two piece cutting cylinder, each side or section of the cutting cylinder is driven with a mallet. Such a cutter is commonly used to avoid damaging the hole, as can happen when a manually rotated type hole cutter is used, or when it is desired to extract a soil plug out of the green in one piece. A one piece soil plug can also be extracted by using a rotating type cup hole cutter, but often it is extremely difficult to manually drive the hole cutter to the desired depth. So often a mallet driven two piece cylinder type hole cutter is utilized because it is generally less laborious to drive this type of hole cutter than the manually rotated type. There are several inherent problems with the mallet driven two piece cutting cylinder hole cutters because the cutting cylinder is in two sections. There is a tendency for the gap between the two sections to snag grass blades when the device is rotated to separate the soil plug from the soil at the base of the hole. Also when this type of hole cutter is extracted from the hole, there is a tendency for the soil trapped between the two cutting cylinder sections to fall out because there is a slight increase in the diameter of the cutting cylinder because the tension placed on the sides of the cylinders is negated when the device is removed from the hole. Another problem with the two piece cutting cylinder mallet driven hole cutter is that the cutting sections are held in place with a cage like device that has a series of flat circular rings supported with welded bracing between each of the rings. The problem is that, in operation, the device is placed where the hole is to be cut, a ring rests on the surface of the green which can, if the green surface is moist, cause the ring to depress the area of the green it is in contact with. This leaves an indentation around the top of the hole which is not a desirable condition. Also, since it is required to cut the hole vertically. Placing this device on a slope or incline makes it impossible to cut a vertical hole, since the ring that contacts the green surface must lay with the entire circumference of the ring contacting the green surface, if it were placed on a slope of any degree the hole would not be able to cut vertically. Often, even though a consistent depth may be achieved when cutting the hole, due to different soil condition, moisture content and grass variety, when the soil plug is placed in the old hole the plug may be above or below the grade of the green. The two piece cutting cylinder hammer driven hole cutting device cannot be used to extract a plug by manually rotating the device. This causes a problem when there is a need to remove a portion of the soil plug when the plug is above or below the grade of the green. Another difficulty with the aforementioned device is that, in operation, the operator must crouch to drive the cutting cylinders and drive each section of the cutting cylinder separately. The depth gauge devices used on these devices are not consistent. A strip of tape is often used to indicate the depth the cutter is at, or a series of screws that screw through a series of nuts that are welded to the top ring of the housing. The operator must again crouch to see if the cutting cylinders are at the desired depth, the tape does not stop himm, so often the hole is cut too deep or too shallow. The screw type depth gauge stops the cutting cylinders at the desired depth but are generally ineffective because they are not strong enough to sustain the continuous hammering resulting in bending or breaking of the screws. Also the aforementioned devices have no means of tamping the soil plug so that it is on a grade that is level with the surface of the green.

SUMMARY OF THE INVENTION

After considerable research and experimentation, a hammer driven soil coring device for use on golf course greens has been devised. The problems noted above are solved by the present invention which provides a hammer driven soil coring device that is essentially comprised of an impact head cap that is comprised of a viewing aperture located at the end of the impact head, two oppositely opposed holes through which a handle with a centrally located smaller hole is perpendicularly oriented. At the top of the tube is attached a bubble level which is viewable through the aperture located at the striking end of the impact head. A small hole in the tube is provided so that the handle and impact head may be affixed to the tube with a spring lock pin. The tube has a slot located on one side that serves as a guide slot for the device that serves as the depth setting mechanism which is comprised of a short piece of metal bar that has a threaded hole to which a cap head scrwew is inserted to provide an adjustable depth setting mechanism. This slot also serves as a guide for a tamping plate control knob. This knob extends through the slot and into a cylindrical rod located inside the tube with a threaded hole at one end and the tamping plate at the other end. The tube is affixed to a cylindrical cutting tube by means of a series of cap head screws that extend into the tube through a collet. The outside diameter of the tube is reduced slightly at this end so that it bears on the collet. The collet diameter is smaller than the diameter of a cutting cap that has a slight recess on its outside diameter, below which the cutter cap extends approximately ½ inch into the cutting cylinder to which a series of cap head screws affix the cutter cap to the cutting cylinder which has a series of holes through which the cap head screws extend. The tube extends slightly beyond the bottom of the cutter cap whereupon it is permanently affixed to the cutter cap. Two oppositely opposed slots extend along the cutting cylinder, one end of each slot is slightly wider than the opposite end. Through these slots slideably oriented is a foot push that serves as a soil plug ejector mechanism. A hole located in the center of the ejector mechanism allows the cylindrical rod to which the tamping plate is attached to freely pass through the ejector mechanism so that the ejector mechanism will move upwards when a hole is being cut and downwards against the tamping plate to eject the soil core.

BRIEF DESCRIPTION OF DRAWINGS

Refer now to the figures in which like numerals depict like parts:

FIG. 1 is an elevational view of the invention.
FIG. 2 is an enlarged view of the impact head
FIG. 3 is an enlarged view of the cutter cup

DESCRIPTION OF THE PREFERRED EMBODIMENT

Referring to the drawing and more particularly FIG. 2 and FIG. 3. Numeral 62 refers to an impact head consisting of an aperture 64 that serves as a viewing aperture for a bubble level 18 a transverse hole 66 allows a handle 12 to extend perpendicularly through a tube 14. A hole 16 allows a handle 12 and impact head 60 to be affixed to tube 14 with a spring lock pin. The lower portion of the impact head 68 indicates the proximity of impact head 60 to tube 14.

In FIG. 3 tube 14 extends through cutter cap 70 at collet 78 through which extend cap head screws 77 into the walls of tube 14. The middle part 76 of the cutter cap 70 bears upon a cutting cylinder 33. A shoulder 74 serves to support the cutter cap 70 and is affixed to the cutting cylinder 33 with a series of cap head screws 73 that extend into the inner part 72 of the cutter cap 70. Tube 14 extends through the cutter cap 70 and at the end 75 of tube 14 is a welding bead 79 that affixes the tube 14 to the cutter cap 70. Cylindrical rod 28 slides vertically inside tube 14 and extends through ejector mechanism 36 and has a tamping plate 30 permanently affixed at one end with a weld bead 80 on the inside and flush weld bead 82 at the outside.

FIG. 1 refers to an overall view of the invention. The numerals are explained in the aforementioned paragraphs.

Referring to FIGS. 1, 2, & 3. In operation the bubble level 18 is used to place the invention in a vertical position, wherein the impact head 60 is then struck with a hammer. The hammer is preferably a soft faced type weighing approximately three pounds. The percussive action drives the cutting cylinder 33 into the surface of the green until the required cutting depth is achieved. This occurs when the soil plug pushes the tamping plate 30 upwards until the end of the cylindrical rod 28 located in tube 14 contacts a stop 22 which has been set to achieve a predetermined cutting depth. Once the required depth has been achieved, the ejector mechanism 36 is pushed downward by the operator with his feet until the soil plug is removed from the cutting cylinder 33. Then the tamping plate 30 is extended beyond the cutting cylinder 2"-3" by pushing a hand knob 26 downwards and tightening it against tube 14. The hand knob 26 locks the tamping plate 30 into position and permits the operator to have a device to tamp the top of the soil plug so that it is level.

It is understood that the form of the invention herewith shown and described is to be taken as a preferred example of the same, and that various changes in shape, size and arrangement of the parts may be resorted to without departing from the spirit of the invention or scope of the subjoined claims.

I claim:

1. A hammer driven soil coring device for use on golf course greens comprising a cylindrical cutting tube having a lower cutting edge and opposed longitudinally extending guide slots, a foot engageable ejector plate slideably received in said slots and extending laterally beyond each side of said cutting tube, a cutter cap and means for attaching said cutter cap to said cutting tube, a support tube having a longitudinally oriented clamping slot on one side thereof, said support tube being attached at one end to said cutter cap and having a perpendicularly extending handle extending through a second end portion, an impact head attached at the second end portion of said support tube and extending below said handle, an elongated slideable rod having a first end terminating within said support tube and a second end secured to a tamping plate, a hand knob that extends through said clamping slot and communicates with said elongated slideable rod for adjustably clamping said rod against axial movement within said support tube, an adjustable stop associated within said support tube that contacts said first end of said elongated slideable rod to preset the position of said tamping plate with respect to said cutting edge thereby permitting the desired cutting depth.

2. A hammer driven soil coring device according to claim 1 adjacent said second end of said support tube and wherein said impact head contains an aperture that permits said bubble level to be visible to the operator.

3. A hammer driven soil coring device according to claim 1 wherein said impact head bears upon said handle.

4. A hammer driven soil coring device according to claim 1 wherein said impact head is affixed to said support tube by said handle.

5. A hammer driven soil coring device according to claim 1 wherein said support tube is affixed to said cutter cap by means of a series of cap head screws.

6. A hammer driven soil coring device according to claim 1 wherein said cutter cap bears upon said cylindrical cutting tube by means of a recessed shoulder.

* * * * *